United States Patent [19]

Mims

[11] 4,313,778
[45] Feb. 2, 1982

[54] ULTRASONIC SEAMING APPARATUS

[75] Inventor: Bruce L. Mims, Westport, Conn.

[73] Assignee: Branson Ultrasonics Corporation, New Canaan, Conn.

[21] Appl. No.: 189,344

[22] Filed: Sep. 22, 1980

[51] Int. Cl.³ .................... B29C 27/08; B32B 31/20
[52] U.S. Cl. ............................. 156/358; 156/366; 156/580.1; 228/1 R
[58] Field of Search .................. 156/73.1, 73.4, 580.1, 156/580.2, 358, 366; 425/174.2; 228/1

[56] References Cited
U.S. PATENT DOCUMENTS 3,294,616 12/1966 Linsley et al. ................. 156/73.1
3,666,599 5/1972 Obeda ........................... 156/580.1
3,841,947 10/1974 Bocquet et al. ................ 156/73.1
3,844,869 10/1974 Rust, Jr. ........................ 156/73.1
3,852,144 12/1974 Parry ............................. 156/73.3
4,090,897 5/1978 Minick ........................... 156/73.1
4,097,327 6/1978 Calemard ....................... 156/580.2

Primary Examiner—Michael G. Wityshyn
Attorney, Agent, or Firm—Ervin B. Steinberg; Philip J. Feig

[57] ABSTRACT

An ultrasonic seaming method and apparatus for continuously bonding thermoplastic material are disclosed. A movable anvil is disposed opposite the output end of a horn for providing a gap through which the thermoplastic material is conveyed. The anvil cyclically is moved away from the face of the horn and immediately thereafter is urged under slight adjustable pressure against the underside of the material and then is clamped in position for a predetermined period of time or an amount of material feed.

12 Claims, 6 Drawing Figures

ULTRASONIC SEAMING APPARATUS

BRIEF SUMMARY OF THE INVENTION

This invention relates to a method and apparatus using high frequency vibratory energy for effectuating a bond between thermoplastic films. More specifically, the present invention concerns a method and apparatus in which two or more thermoplastic films, superposed upon one another, are fed through a gap or nip which is formed between an ultrasonically vibrating tool, also known as a horn or resonator, and an anvil which is affixed to a movable anvil support. The anvil and anvil support are urged against the underside of the superposed films, constituting the workpiece, while the horn, in forced contact with the top surface of the workpiece, transfers ultrasonic energy to the workpiece to provide a bond or seal between the superposed film surfaces confined in the gap. As the workpiece is fed through the gap in a continuous motion a seaming operation is obtained. Apparatus of this type have been shown for instance U.S. Pat. Nos. 2,633,894 issued to P. B. Carwile entitled "Plastic Welding" dated Apr. 7, 1953; No. 3,294,616 issued to S. G. Linsley et al entitled "Apparatus for Sealing Polymeric Sheet Material by Ultrasonic Energy" dated Dec. 27, 1966; or No. 3,666,599 issued to E. G. Obeda entitled "Sonic or Ultrasonic Seaming Apparatus" dated May 30, 1972.

When seaming relatively thin films such as are used for providing bags in the snack food field, seaming apparatus as disclosed in the prior art have not proven entirely satisfactory. The high compressive forces used with conventional static loading for seaming thermoplastic film at high feed rates often tear the film when the film accelerates from stop to operational speed. Further, the higher power requirements of the seaming apparatus for producing a satisfactory seam at increasing feed rates cause an undesirable thermal expansion of the horn and/or anvil structure. Additional thermal expansion due to heat dissipation in the horn structure occurs when the horn is vibrating for an extended period of time. Such thermal expansion decreases the critical gap size between the horn and the opposite anvil and is responsible for an inferior quality seam. Similar undesirable effects are produced by the operational wear of the horn and anvil faces.

An additional problem which produces unsatisfactory seams involves the effects on the gap size caused by any inherent non-uniformity of the film thickness as the film is conveyed through the gap. Such variations during seaming may cause the vibrating tool to cut partially or entirely through the film should the film thickness increase. Alternatively, a decrease in film thickness may prevent the transfer of vibratory energy to the thermoplastic film, thus causing insufficient welding.

The above stated problems are overcome in the present invention by periodically resetting the gap between the horn and anvil means so as to compensate for wear of the horn and anvil surfaces, for changes in the gap as a result of thermal expansion of the horn or anvil structure, and lastly for changes and the non-uniformity of the film thickness.

In accordance with the present invention, the anvil is mounted to a movable anvil support which periodically or cyclically is moved away from the face of the horn so as to increase the gap and immediately thereafter is returned to its approximate previous position by being urged under slight adjustable pressure against the underside of the workpiece and then is rigidly clamped in this position for a predetermined period of time or amount of workpiece feed. This opening of the gap and reclosing followed by clamping may be defined as "regapping". The periodic regapping operation compensates for the variables enumerated above and, hence, provides for a satisfactory seaming process of thermoplastic films of extreme thinness and of films with normally unacceptable thickness tolerances.

A principal object of this invention, therefore, is the provision of an improved method and apparatus for the continuous joining of materials by ultrasonic energy.

Another object of this invention is the provision of an ultrasonic seaming method and apparatus which automatically compensates for the effects of thermal expansion and wear of the horn face and anvil structure on the gap size.

Still another object of this invention is the provision of an apparatus for making it easier to insert film into the gap formed by the horn and anvil than is known in prior art devices and eliminating the necessity for manual changes in gap size due to processing workpieces of varying thicknesses.

Further and still other objects of the present invention will become more clearly apparent by reference to the following description when taken in conjunction with the accompanying drawings.

DETAILED DESCRIPTION OF THE INVENTION

Figure 1:
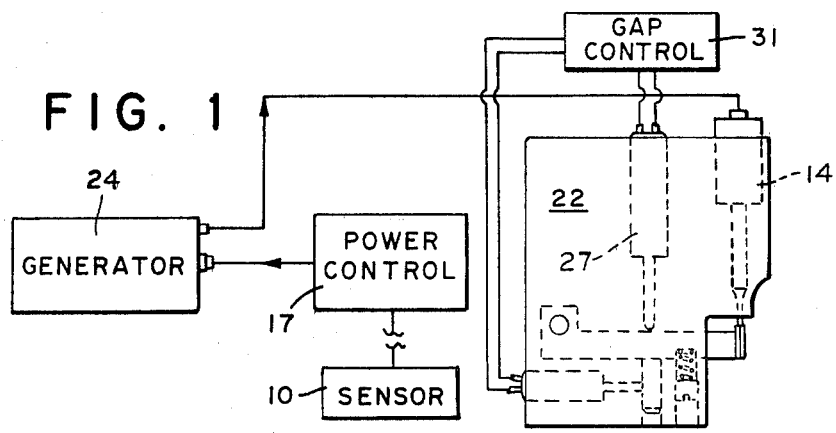
FIG. 1 is a schematic illustration of the present invention.
Figure 2:
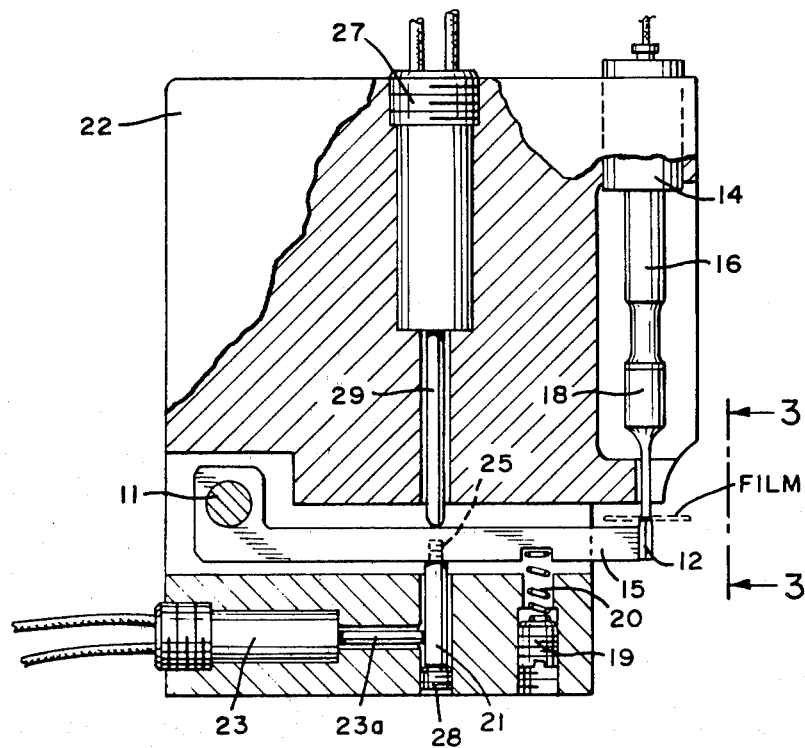
FIG. 2 is a cross-sectional elevational view of a preferred embodiment of the present invention and showing the superposed thermoplastic surfaces supported by the movable anvil means conveyed in the direction of the reader.

Referring now to the figures and FIGS. 1 and 2 in particular, there is shown a stationary support 22 which supports an electroacoustic converter unit 14. The converter unit 14 is coupled to an intermediate horn 16 which in turn is coupled to a tool or horn 18. The horn 18 receives mechanical vibrations from the converter unit 14 via the horn 16 and provides vibrations with amplified magnitude at its frontal or output surface. The horn 18 is a stepped horn of cylindrical cross section (see U.S. Pat. No. Re 25,033 issued to Balamuth) and is adapted to be rendered resonant along its longitudinal axis. The horn 18 is dimensioned so that its frontal surface is disposed substantially at an antinodal region of longitudinal motion. Typically, the transducer assembly (converter, intermediate horn, and horn) is dimensioned to be mechanically resonant at a predetermined frequency of, for example, 40 kHz with a peak-to-peak displacement amplitude of 0.006 inch maximum at the output surface (output end) of the horn 18. The horn's displacement amplitude in the present invention is varied in proportion to the feed rate. The described transducer assembly is only by way of example and not of limitation and the construction of the transducer assembly and horns to produce the desired amplitudes of vibration at specific frequencies is well known to those skilled in the art, see patents supra.

Figure 6:
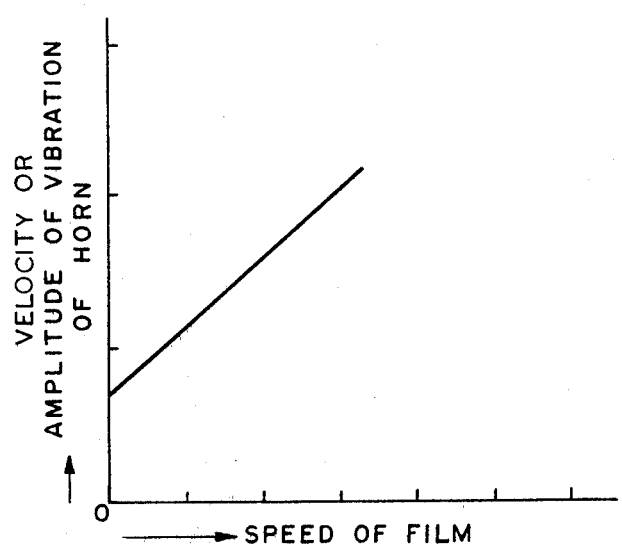
FIG. 6 is a graph showing the relation between the speed of the film through the nip and the amplitude of vibration of the horn.

Proper seaming of the film subjected to ultrasonic energy is obtained only if the velocity of the horn is varied with the film speed or feed rate; see FIG. 6. A film speed sensor 10 is connected to a power control means 17 which is electrically coupled to the electrical generator 24. Sensor 10 continuously monitors the rate of film feed and causes the power control means 17 to adjust the power supplied by the generator 24 to the converter 14 commensurate with the sensed film speed. Electrical circuit control means for varying the horn velocity (displacement amplitude), which is related to power, in proportion to the film speed are disclosed, for instance, in U.S. Pat. No. 3,666,599 supra.

Figure 3:
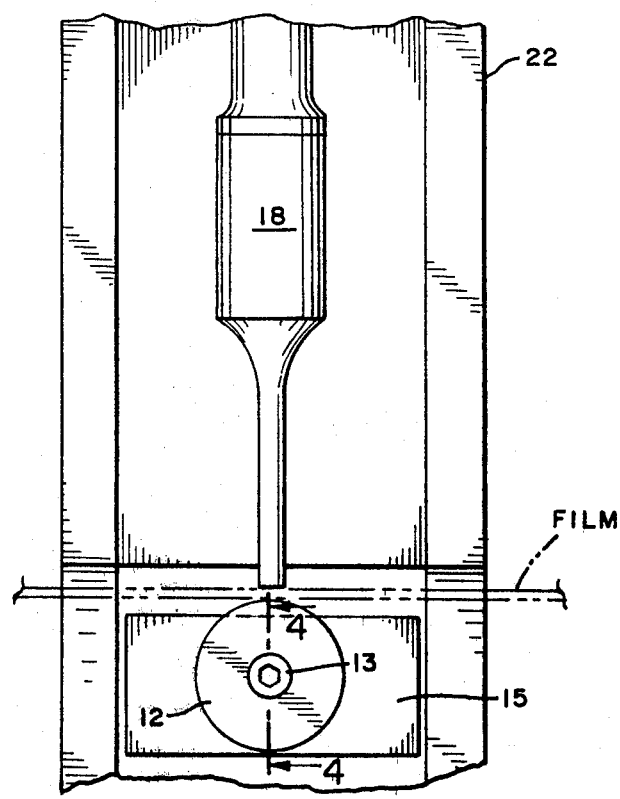
FIG. 3 is a view along line 3—3 in FIG. 2.
Figure 4:
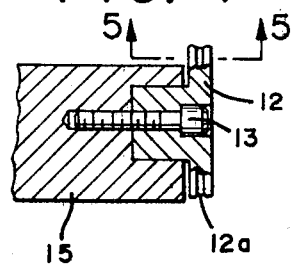
FIG. 4 is a cross-sectional view of a portion of the anvil means.
Figure 5:
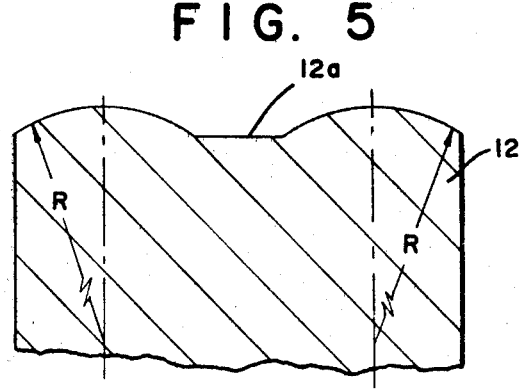
FIG. 5 is an enlarged sectional view of the anvil means along line 5—5 in FIG. 4.

Referring now to FIG. 3, the frontal or output surface of the horn 18 is mounted opposite a stationary wheel composed, for example, of steel. This wheel forms an anvil 12 which is nonrotatable by means of locking screw 13 or similar affixing means; see also FIG. 4. The anvil 12 is formed from a single block of material machined so as to present two spherically convex surfaces which engage the film. A spherical radius of 0.5 inch was found to produce a satisfactory anvil. An annular groove 12a, FIG. 5, is disposed between the surfaces which engage the film.

Referring again to FIGS. 1 and 2, the anvil 12 is affixed to a movable anvil support 15, having the shape of a beam, which is pivotally mounted to the stationary support 22 by means of a shaft 11. The anvil 12 is then capable of limited, substantially longitudinal, displacement away from and toward the frontal surface of the horn 18.

Means are also provided for applying a slight adjustable force to urge the anvil and workpieces against the flat frontal face of the horn. In the present example, a spring 20 whose upper end engages a recess in anvil support 15 and whose lower end engages a screw 19, which is in threaded engagement with stationary support 22, provides such adjustable force responsive to the position of the screw. The spring's upward force is not critical, however, satisfactory results have been obtained with forces in the range from 50 to 600 grams.

Also connected to the anvil support 15 is a pin 21 which coacts with a plunger 23a. The latter may be a part of a fluid actuated cylinder and piston assembly 23 suitably disposed within stationary support 22. Pin 21 at its upper end is rigidly affixed to the anvil support 15 by means of a thread 25. The plunger 23a when extended maintains the anvil support 15 and anvil 12 in a fixed position relative to the horn face, thereby defining the gap for the predetermined time interval or seaming cycle within which ultrasonic energy is imparted to the film as it is conveyed past the frontal surface of the horn. Plunger 23a is withdrawn from clamping contact with the pin 21 at the conclusion of the predetermined cycle.

Mounted also within the stationary support 22 is a motive means such as an air cylinder 27 of conventional design containing a piston 29 which is capable of displacing the anvil support 15 and, therefore, the anvil 12. The downward displacement of the anvil support 15 occurs when the plunger 23a is disengaged from pin 21. The downward displacement of the anvil support 15 is limited by an adjustable screw 28 which is in threaded engagement with stationary support 22.

Connected both to the assembly 23 and the cylinder 27 is gap control 31. Gap control 31 includes a timer or other suitable means for coordinating the motions of plunger 23a and of piston 29 at the beginning and end of each predetermined cycle.

DESCRIPTION OF OPERATION

The operation of the above described device may be more clearly understood with reference to FIG. 2.

At the beginning of a predetermined time interval or seaming cycle, plunger 23a being disengaged from pin 21, piston 29 of air cylinder 27 is driven forward to engage the movable anvil support 15, thereby moving the anvil 12 away from the output surface of the horn 18 as limited by the screw 28. Anvil support means 15 also compresses adjustable spring 20. Two or more layers of thermoplastic film to be seamed are fed into the gap formed between the anvil and horn. At this time the film motion in the direction of conveyance is stopped. Now, gap control 31 causes the cylinder 27 to retract piston 29 so as to free the anvil support 15 and cause the spring 20 to urge the anvil 12 and the workpieces against the output face of horn 18. Compressed fluid triggered by control 31 then forces plunger 23a to engage pin 21 so as to lock or clamp the face of the movable anvil 12 in a fixed position with respect to the face of the horn. The gap (nip) formed thereby is in effect the thickness of the films to be seamed.

Following the clamping of anvil 12 in fixed position, power control 17 is operated to cause the generator 24 to apply electrical energy to the converter 14 for driving the horn with high frequency vibratory energy, typically at 40 kHz. Initially, when the material is standing still, the horn vibrates at a very low amplitude (hop off value) as seen in FIG. 6. Soon after the initial high frequency excitation of the converter 14, the conveyance of the film through the gap is started. Responsive to the output of the sensor 10 providing a control signal to the power control 17 the amplitude of vibration of the horn increases with the increasing speed at which the film passes through the nip between the anvil and the frontal surface of the resonating horn and the film is seamed. A typical film feed rate is 180 feet per minute when high density polyethylene or polypropylene film 0.002 inch thick is processed. For obtaining satisfactory seaming, the velocity of the horn or resonator displacement amplitude is varied in substantially direct proportion to the speed of the film. At the conclusion of a predetermined time interval or amount of feed (whose theoretical maximum is dictated by the rate of thermal expansion and wear of the horn and anvil but whose practical limit is dictated typically by the length of a plastic bag), the film speed in the direction of the film conveyance through the gap is brought to zero. At zero speed the horn vibrates at a very low amplitude of vibration which is then brought to zero. Responsive to the operation of the gap control means 31 plunger 23a is retracted from pin 21 and piston 29 is extended to move the anvil 12 away from the horn and workpiece. The gap set during the following steps will automatically compensate for thermal expansion and wear of the ultrasonic members in addition to changes in the thickness dimensions of the workpiece films to be joined. The apparatus of the present invention provides substantial improvement in the welding speed of the film while enhancing the integrity of the resulting ultrasonic seam.

While in the above stated embodiment values for a frequency of 40 kHz have been stated, it will be apparent to those skilled in the art that another ultrasonic frequency in the range from 20 to about 80 kHz may be used and that no limitation is intended with respect to the heretofore stated values.

Although an illustrative embodiment of this invention has been described in detail herein with reference to the accompanying drawings, it is to be understood that the invention is not limited to this precise embodiment, and that various changes and modifications may be effected therein by one skilled in the art without departing from the scope or spirit of the invention.

What is claimed is:

1. An ultrasonic seaming apparatus comprising:
   an electroacoustic converter adapted to provide mechanical high frequency vibrations in response to applied electrical energy;
   a horn coupled to said converter for receiving at an input end thereof said vibrations and providing at an opposite output end said vibrations to material in contact with said horn;
   movable anvil means disposed opposite said output end of said horn for providing with said horn a nip through which thermoplastic material to be seamed is conveyed and seamed responsive to the transfer of ultrasonic energy from said output end to the material while the material is in forced contact with said horn;
   force means coupled to said anvil means for urging said anvil means into motion toward contact with said output end of said horn;
   motive means coupled to said anvil means for causing when actuated motion of said anvil means in a direction opposite to that urged by said force means;
   clamping means disposed for clamping said anvil means in fixed position relative to said output end to maintain a predetermined gap between said output end and said anvil means responsive to the position of said output end, the force exerted by said force means, and the thickness of material disposed in said nip, and
   control means coupled to said motive means and said clamping means for cyclically actuating said motive means and said clamping means whereby to cylically reset said gap and maintaining said reset gap for a predetermined duration.

2. An ultrasonic seaming apparatus as set forth in claim 1, and support means for fixedly mounting said converter with said anvil means being movable relative thereto.

3. An ultrasonic seaming apparatus as set forth in claim 1, and including power control means for controlling the electrical energy applied to said converter.

4. An ultrasonic seaming apparatus as set forth in claim 3, and including a speed sensor disposed for sensing the speed with which the material is conveyed through said nip and providing a speed responsive signal to said power control means.

5. An ultrasonic seaming apparatus as set forth in claim 3, said power control means causing the amplitude of vibration of said horn to increase with increasing speed at which the material is conveyed through said nip.

6. An ultrasonic seaming apparatus as set forth in claim 1, said movable anvil means comprising a beam whose one end disposed opposite the output end of said horn is provided with an anvil, and whose other end is mounted to a stationary support for limited pivotal displacement toward and away from said output end.

7. An ultrasonic seaming apparatus as set forth in claim 6, said anvil comprising at least one stationary spherical surface disposed opposite said output end.

8. An ultrasonic seaming apparatus as set forth in claim 6, said force means comprising a spring disposed between said beam and said support, and means for adjusting the force exerted by said spring.

9. An ultrasonic seaming apparatus as set forth in claim 1, said motive means including fluid driven means.

10. An ultrasonic seaming apparatus as set forth in claim 1, said clamping means including a pin coupled to said movable anvil means, and motive means controlled by said control means for locking said pin in position relative to the output end of said horn.

11. An apparatus for seaming thermoplastic film by ultrasonic energy wherein the film is passed through a gap between an anvil and a horn adapted to vibrate at an ultrasonic frequency and the gap between said horn and said anvil is adjustable to compensate for changes of the horn, anvil or film to be sealed, the improvement comprising: adjusting means operatively associated with said anvil for adjusting said gap and for maintaining said gap substantially constant; control means coupled to said adjusting means and operated cyclically for causing said gap responsive to the operation of said control means to be readjusted to compensate for the changes and causing said adjusting means to maintain such readjusted gap substantially constant between readjusting cycles.

12. An apparatus for seaming as set forth in claim 11, said adjusting means including force means operatively associated with said anvil for providing a predetermined engagement force with which said anvil urges a film disposed in said gap against said horn; said control means causing said adjusting means when adjusting the gap to first increase the gap and then to decrease the gap to a dimension responsive to the thickness of the film disposed in said gap and said engagement force.

* * * * *